(12) United States Patent
Duggan et al.

(10) Patent No.: US 11,058,130 B2
(45) Date of Patent: Jul. 13, 2021

(54) INTERNET OF FOOD

(71) Applicant: NCR Corporation, Atlanta, GA (US)

(72) Inventors: Sean Bradley Duggan, Atlanta, GA (US); Sanjeev Kumar Singh, Johns Creek, GA (US)

(73) Assignee: NCR Corporation, Atlanta, GA (US)

( * ) Notice: Subject to any disclaimer, the term of this patent is extended or adjusted under 35 U.S.C. 154(b) by 139 days.

(21) Appl. No.: 16/557,535

(22) Filed: Aug. 30, 2019

(65) Prior Publication Data

US 2021/0059280 A1    Mar. 4, 2021

(51) Int. Cl.
*A23L 3/00* (2006.01)
*G01K 13/12* (2006.01)
*G08B 25/14* (2006.01)
*G08B 21/18* (2006.01)

(52) U.S. Cl.
CPC ............... *A23L 3/00* (2013.01); *G01K 13/12* (2013.01); *G08B 21/182* (2013.01); *G08B 25/14* (2013.01)

(58) Field of Classification Search
CPC ...... G01K 1/026; G01K 2207/02; G01K 3/04; G01K 13/00; G01K 1/024; G01K 3/005; G08B 21/182; G08B 21/24; G08B 21/245; G08B 25/10; H04B 17/23
See application file for complete search history.

(56) References Cited

U.S. PATENT DOCUMENTS

| | | | |
|---|---|---|---|
| 6,817,757 B1 * | 11/2004 | Wallace | F24C 7/08 340/870.17 |
| 2016/0034907 A1 * | 2/2016 | Worrall | G06Q 30/018 705/317 |
| 2019/0147730 A1 * | 5/2019 | Shoari | G08B 25/10 340/870.07 |

* cited by examiner

*Primary Examiner* — Omeed Alizada
(74) *Attorney, Agent, or Firm* — Schwegman, Lundberg & Woessner

(57) ABSTRACT

Disclosed are systems and methods for improving food quality. The systems and methods include receiving first temperature data from a first food service device, determining when the first temperature data exceeds a predetermined temperature value, and activating a first alarm when the first temperature data exceeds the predetermined temperature value. The first temperature data corresponds to a food temperature of food. The systems and methods may also include discarding the food in response to the first alarm being activated.

16 Claims, 4 Drawing Sheets

INTERNET OF FOOD

SUMMARY

Disclosed are systems and methods for improving food quality. The systems and methods include receiving first temperature data from a first food service device, determining when the first temperature data exceeds a predetermined temperature value, and activating a first alarm when the first temperature data exceeds the predetermined temperature value. The first temperature data corresponds to a food temperature of food. The systems and methods may also include discarding the food in response to the first alarm being activated.

BRIEF DESCRIPTION OF THE FIGURES

The above-mentioned and other features and advantages of this invention, and the manner of attaining them, will become more apparent and the invention itself will be better understood by reference to the following description of embodiments taken in conjunction with the accompanying drawings, wherein.

Corresponding reference characters indicate corresponding pails throughout the several views. The examples set out herein illustrate possible embodiments, and such examples are not to be construed as limiting the scope of this disclosure in any manner.

DETAILED DESCRIPTION

Disclosed herein are systems and methods that allow for the proactive monitoring of food and equipment used in the service industry so that the overall systems can be improved by decreasing downtime, waste, and improving the quality of food and/or service. By monitoring equipment, such as by inserting active sensors where sensors did not exist before, properties such as water temperature (which can be correlated to a food temperature), vibrations within equipment, and how employees are interacting with equipment, provide status alerts and alerts signifying a problem can be generated in real time. Using predictive and prescriptive analytics consistency and quality can be driven to higher levels. The result can include increased equipment uptime, availability, consistency, and quality. Additional benefits can include monitoring of service level agreements (SLAs) to police brand, franchisee accountability, waste, etc.

The systems and methods disclosed herein may include inserting and/or attaching active monitors, such as BLUETOOTH® or other radio frequency monitors to equipment used by employees in the service industry to monitor temperatures such as fryer temperatures, water temperatures, equipment properties such as vibrations, run times, etc. Using the data, underperforming employees can be identified and training regiments can be generated. In addition, equipment can be monitored so as to predict when future maintenance is needed. As the employees are identified, training regiments generated, maintenance schedules created, etc. status alerts or alerts providing notification of a problem can be generated so that correct action can be taken in real time.

The systems and methods disclosed herein allow for "dumb" devices to be transformed into "smart" devices. For example, using the systems and methods disclosed herein food holding trays, such as those found at a salad bar or buffet, can tell when a food well bolding food, and by extension the food in the feed well, is too hot or cold. By monitoring the temperatures food borne illness can be reduced, food quality increase, etc. The alerts can be sent to the store manager, general managers, regional manager, franchise licensor, etc., along with suggest corrective action. The receiver of the alert can then take the corrective action.

Figure 1:
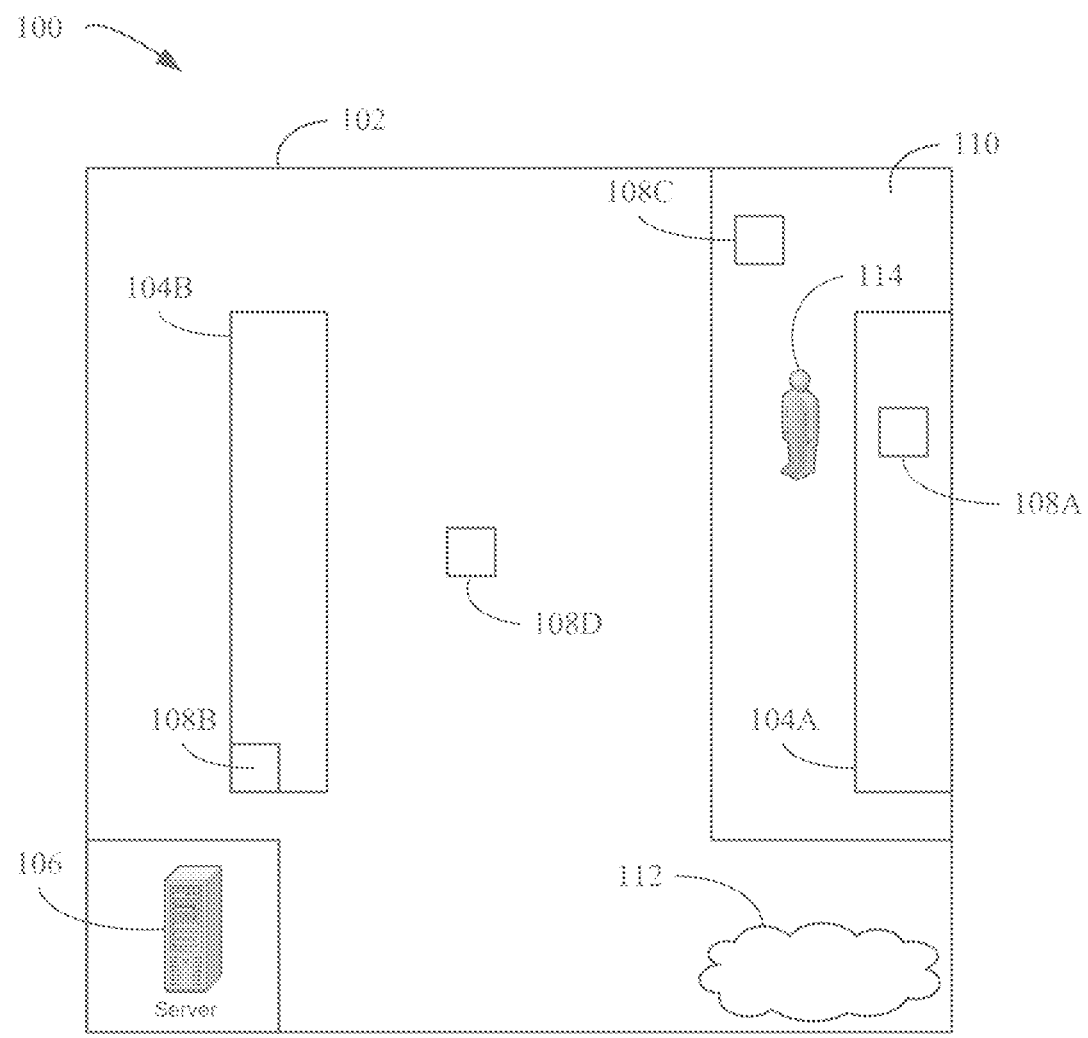
FIG. 1 shows an example operating environment consistent with this disclosure.

Turning now to the figures, FIG. 1 shows an example operating environment 100 consistent with this disclosure. As shown in FIG. 1, operating environment 100 may include a restaurant 102. Within store 102 may be a first food service device 104A and a second food service device 104B (collectively food service devices 104) and a server 106. Each of the food service devices 104 and/or restaurant 102 may include one or more sensors 108 (first sensor 108A, second sensor 108B, third sensor 108C, and fourth sensor 108D). As shown in FIG. 1, first food service device 104A, or any other food service device 104 may be located within a kitchen 110. Sensors 108 may communicate with service 106 via a network 112.

Sensors 108 attached to food service devices 104 may monitor various parameters of food service devices 104. Examples of parameters of food service devices 104 include, but are not limited to, temperatures of working fluids, vibrations within the equipment or components of the equipment, pressures of working fluids, etc. For example, first food service device 104A may include more than one sensor and the sensors may monitor the temperature and pressure of refrigerant as well as vibrations cause by or within a compressor of first food service device 104A. If first food service device 104A is a cooking element, then the sensors may monitor temperatures within various sections of a cooking compartment.

Sensors 108 located throughout restaurant 102 and/or kitchen 110 may monitor environmental conditions within restaurant 102 and/or kitchen 110. Examples of environmental conditions include, but are not limited to, temperature, humidity, ambient noise, foot traffic, etc. For example, pressure sensors within the floor can transmit signals to server 106 that can be converted to a pressure. Changes in pressure can then be correlated to foot traffic. Another example can include kitchen 110 being equipped with temperature, humidity, and ambient noise sensors. Monitoring temperature, humidity, and ambient noise may allow for unsafe working conditions to be determined. For instance, if the temperature, humidity, and/or ambient noise are too high, then working conditions may be unsafe for employee 114.

As disclosed herein, sensors 108 may transmit a signal that is received by server 106. Server 106 may convert the signal into a measurement. For example, if a sensor is a humidity sensor then server 106 may convert the signal into a relative humidity. If the sensor is a temperature sensor then server 106 may convert the signal to a temperature.

The signal may be a voltage. For example, the sensor may be a thermocouple and may generate a voltage. The sensor may be a thermistor and the signal may be a change in resistance. As disclosed herein, sensors 108 may be wireless and communicate with server 106 via network 112. As such, sensors 108 may read voltages, resistances, etc and convert them into wireless signals that are transmitted to server 106.

Non-limiting examples of food service devices 104 include ovens, warming trays, food wells, stoves, fryers, refrigerators, freezers, dishwashers, water heaters, air conditioners for restaurant 102, and any other device used in the preparation of food for service to customers. During preparation and service of food, the food may be prepared in first food service device 104A and be transported to second food service device 104B. For example, food may be cooked in first food service device 104A and then transported to second food service device 104B, which may be a food well where customers may retrieve the food.

As disclosed herein, during food preparation and service, sensors 108 can be used to monitor food service devices 104, kitchen 116, and restaurant 102. For example, if first food service device is a fryer used to prepare French fries, first sensor 108A can monitor the temperature of the oil used to fry the fries. First sensor 108A, or another sensor (not shown) may also monitor a drop time in which the raw fries are dropped into the cooking oil and when the fries are removed from the cooking oil.

After cooking, the fries may be transported to second food service device 104B, which may be a holding vessel. While in second food service device 104B, second sensor 108B may monitor the temperature of the fries. The temperature may be monitored for quality control and/or health reasons. For example, the temperature may be monitored to make sure the fries are not too hot, which could cause a customer to be burnt, or too cold, which a customer may perceive as poor quality. While the example used was friend fries and cooking, the same principles apply to other forms of food preparation. For example, first food service device 104A may be a freezer and second food service device 104B may be a cold bar where customers can get ice cream that was taken from the freezer to the cold bar. The temperature can be monitored to make sure the ice cream stays cold to avoid thawing.

In addition to monitoring food characteristics, sensors 108 may be used to monitor operating characteristics of food service devices 104. For example, first sensor 108A may monitor vibration, pressure of a refrigerant, etc. within a compressor of first food service device 104A. By monitoring vibration, pressure, etc, determinations can be made as to when first food service device 104A is operating within parameters In addition, operations outside the normal operating parameters may signal maintenance is needed. Furthermore, monitoring operating parameters can allow for trends to be identified. The trends may be used to identify degrading performance and/or parts that may be wearing out so that maintenance can be performed before parts break resulting in down unnecessary down time.

As disclosed herein, when a temperature, pressure, vibration, or any other parameter monitored by sensors 108 are outside of a predefined range, an alarm may be activated. For example, if temperature of food exceeds or is below a predetermined temperature then an alarm may be activated. As another example, if a vibration is detected within any of food service items 104 then an alarm may be activated. As disclosed herein, activating an alarm may include server 106 transmitting a portable computing device carried by message to employee 114. Activating an alarm may include server 106 transmitting a message to a remote computer that is located offsite from restaurant 102. Activating an alarm may also include server 106 transmitting an activation signal to food service devices 104 and/or sensors 108. The activation signal may cause an audible or visual alarm to be activated. For example, the activation signal may cause a speaker to emit an audible noise that employee 114 or other employees can hear. Upon activating the alarm corrective actions can be taken.

Corrective actions can include a variety of actions. For example, first food service device 104A may be a fryer and may transmit a first drop time when fries are dropped into the fryer. When a second batch of fries are dropped a second drop time may be transmitted to server 106. If the time between the drop times is greater than a predetermined time, then an alarm may be activated in the form of a message transmitted to employee 114. In addition to activating the alarm, worker data that identifies the worker and the worker's duties with respect to the fryer. Using the worker data and the number of alarms caused by the worker, a training plan may be generated. The training plan may outline additional training worker 114 may need to improve quality and/or reduce the number of alarms triggered.

Sales data can also be used to improve quality and reduce waste. For example, sales per hour of various items can be stored by or received by server 106. Using the sales data inventories can be managed. In addition, the sales data can be used to plan when food should be cook and how much.

As disclosed herein, food service devices 104 and/or sensors 108 may be part of the Internet of Things (IoT). As such, food service devices 104 and/or sensors 108 may be provided with unique identifiers so as to distinguish one device/sensor from another on network 112. Because food service devices 104 and/or sensors 108 are part of network 112, which may be the Internet, food service devices 04 and/or sensors 108 may be monitored and controllable from remote locations. For example, if one of food service devices 104 experiences a malfunction, it can be controlled remote to throttle performance or shut down completely to avoid potential damage to the equipment.

Figure 2:
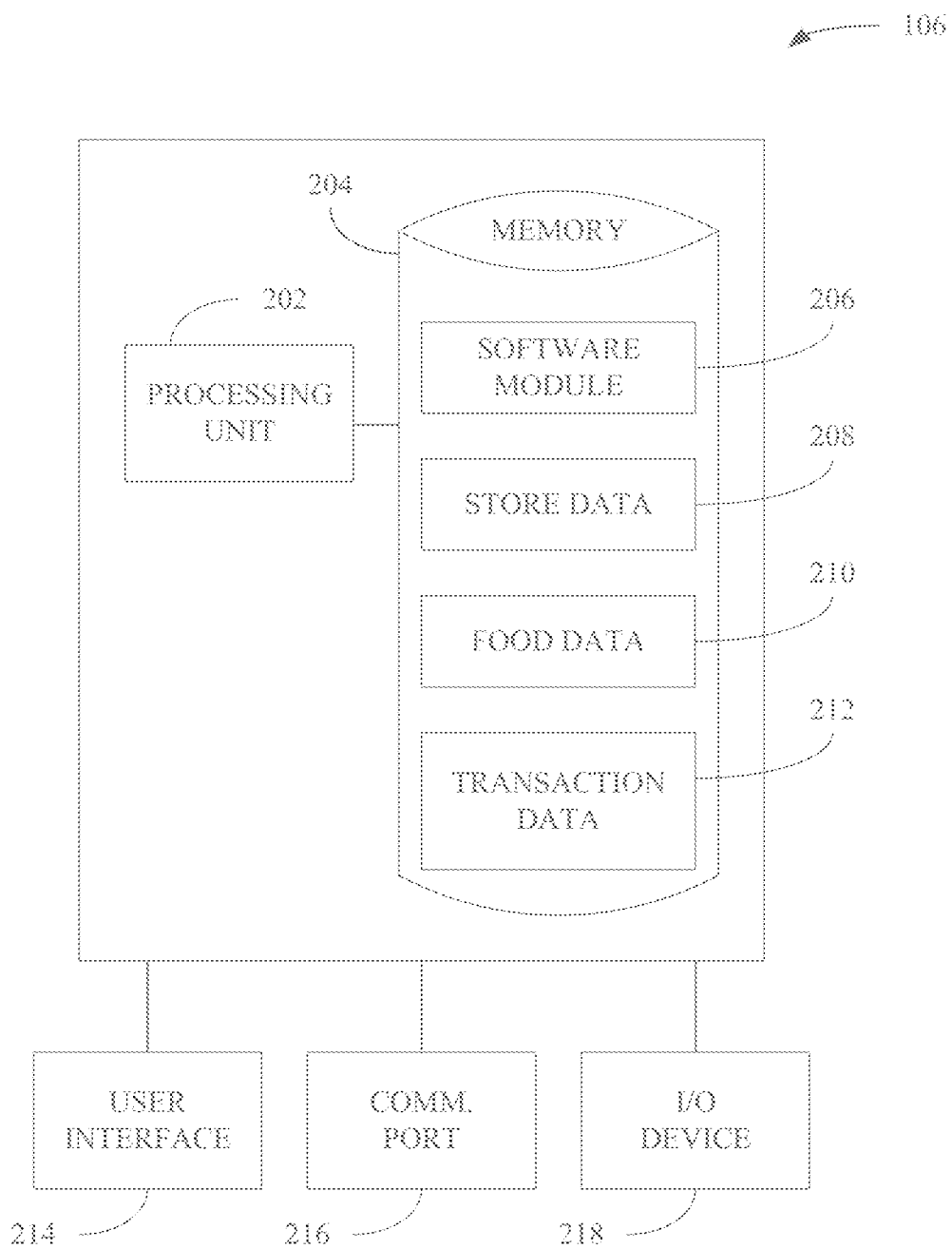
FIG. 2 shows an example schematic of a server consistent with this disclosure.

FIG. 2 show's an example schematic of server 106. As shown in FIG. 2, server 106 may include a processing unit 202 and a memory 204. The memory 204 may include a software module 206, a store 208, food data 210, and transaction data 212. While executing on processing unit 202, the software module 206 may perform processes for monitoring food and other services at store 102, including, for example, one or more stages included in a method 400 described below with respect to FIG. 4. Server 106 may also include a user interface 214, a communications port 216, and an input/output (I/O) device 218.

As disclosed herein, store data 208 may include a listing of food service devices, sensors, including which sensors are attached to which food service devices. Store data 208 may also include calibration curves and/or lookup tables that server 106 can use to covert signals received from sensors 108 to temperatures, pressures, vibrations, etc. Store data 208 may also include operating parameters for food service devices 104. Store data 208 may include maintenance schedules for food service devices 104.

Food data 210 may include temperatures at which food is to be cooked, stored, served, etc. Food data 210 may also include parameters in which food is to be prepared, stored, served, etc. For example, food data 210 may specify that fries are to be cooked for X minutes at a temperature of Y. Once cooked, food data 210 may specify that the fries can be kept no longer than Z minutes as long as the temperature remains above W degrees. Should the temperature of the fries fall below W degrees, food data 210 may specify that the fries are to be discarded.

Transaction data 212 may include, but is not limited to, items purchased during a transaction, a time the transaction occurred, etc. As disclosed herein, transaction data 212 may allow for inventory management and plans for anticipated food demands to be developed so as to minimize waste.

User interface 214 can include any number of devices that allow a user to interface with server 106. Non-limiting examples of user interface 214 include a keypad, a microphone, a display (touchscreen or otherwise), etc.

Communications port 216 may allow server 106 to communicate with various information sources and devices, such as, but not limited to, remote computing devices, mobile devices, peripheral devices, etc. Non-limiting examples of communications port 216 include, Ethernet cards (wireless or wired), Bluetooth® transmitters and receivers, near-field communications modules, etc. User interface 214 may also use communications port 216 to communicate with server 106. For example, user interface 214 may be a tablet computer that includes a virtual keyboard that communicates with server 106 via communications port 216.

I/O device 218 may allow server 106 to receive and output information. Non-limiting examples of I/O device 218 include, sensors such as sensors 108, etc.

Figure 3:
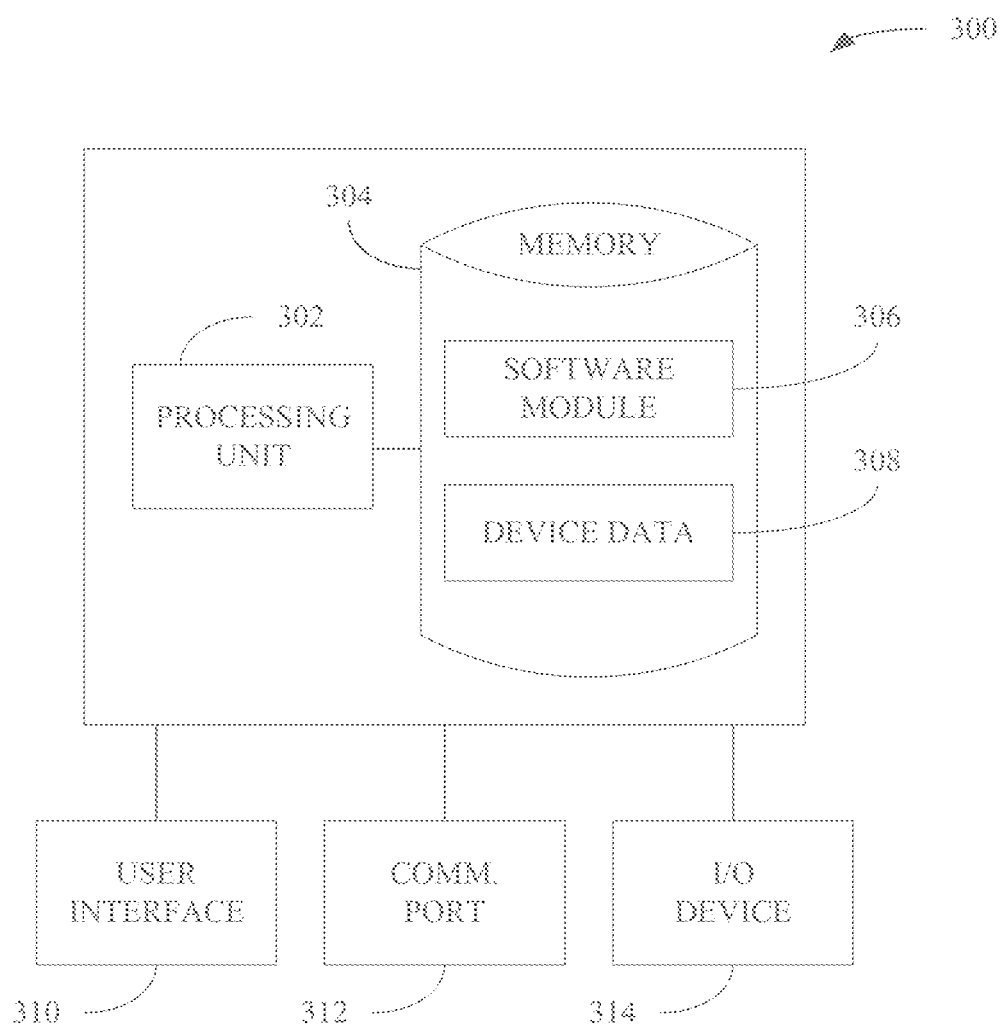
FIG. 3 shows an example schematic of a food service device consistent with this disclosure.

FIG. 3 shows an example schematic of a food service device 300, such as any one of food service devices 104, consistent with this disclosure. As shown in FIG. 3, food service device 300 may include a processing unit 302 and a memory 304. The memory 304 may include a software module 206, and device data 208. While executing on processing unit 202, the software module 206 may perform processes for operating food service device 300, for example, one or more stages included in a method 400 described below with respect to FIG. 4. Food service device 300 may also include a user interface 310, a communications port 312, and an input/output (I/O) device 314.

As disclosed herein, device data 208 may include calibration curves and/or lookup tables that food service device 300 can use to covert signals received from sensors 108 to temperatures, pressures, vibrations, etc. device data 208 may also include operating parameters for food service device 300. Device data 208 may include maintenance schedules for food service device 300.

User interface 310 can include any number of devices that allow a user to interface with food service device 300. Non-limiting examples of user interface 310 include a keypad, a microphone, a display (touchscreen or otherwise), etc.

Communications port 312 may allow food service device 300 to communicate with various information sources and devices, such as, but not limited to, server 106. Non-limiting examples of communications port 312 include, Ethernet cards (wireless or wired), Bluetooth'S) transmitters and receivers, near-field communications modules, etc.

I/O device 314 may allow food service device 300 to receive and output information. Non-limiting examples of I/O device 314 include sensors 108.

As disclosed herein, food service device 300 may communicate directly with server 106 after receiving signals from sensor's 108. In addition, sensors 108 may communicate directly with server 106 and bypass food service device 300.

Figure 4:
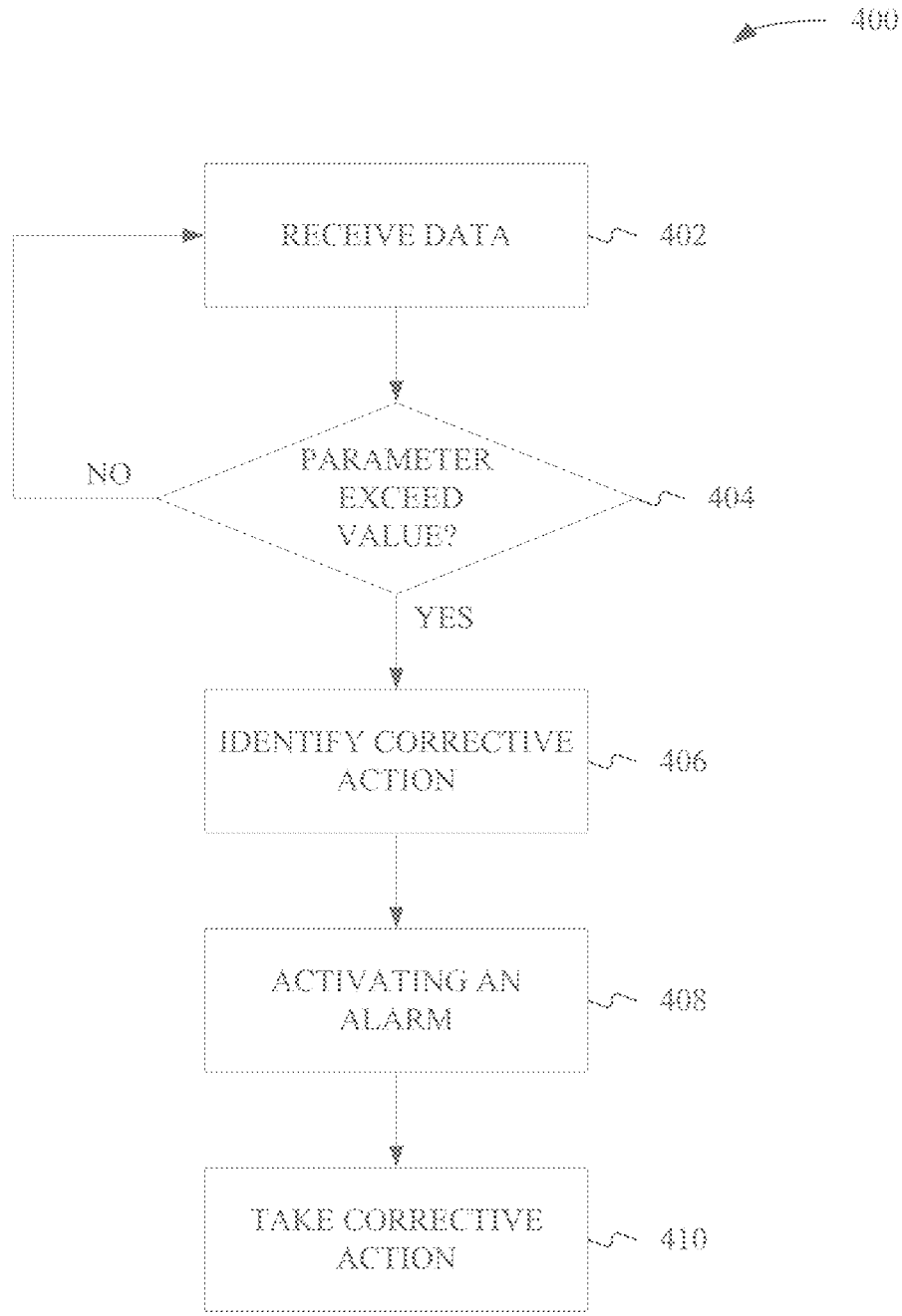
FIG. 4 shows an example method consistent with this disclosure.

FIG. 4 shows an example method 400 consistent with this disclosure. Method 400 may begin at stage 402 where data may be received at server 106. As disclosed herein, the data may be received directly from sensors 108 and/or from food service devices. Receiving data may include receiving one or more sets of temperature data from sensors and/or food service devices. Receiving data may include receiving one or more drop times. Receiving data may also include receiving worker data that identifies workers and the worker's duties and schedule. Receiving data may include receiving equipment data.

As disclosed herein, receiving data may occur at regular intervals. For example, sensors 108 located throughout restaurant 102 may transmit signals to server 106 on a continuous basis or at intervals such as every second, every minute, every half hour, etc. Sensors 108 may transmit signals to server 106 only when a fault or a reading is outside a normal operation parameter.

From stage 402 method 400 may proceed to decision block 404 where a determination may be made as to whether a parameter exceeds a predetermined value. Determining if the value exceeds the predetermined value may include determining if a temperature is above and/or below predetermined values. For instance, if a temperature is greater than a preset temperature then the fries may be burnt. A determination that a parameter exceeds a predetermined value may include determining that a vibration, temperature, and/or pressure of a food service device exceeds values that may indicate decreased operation, damage to a component, etc. If no parameter values exceed predetermined values method 400 may proceed to stage 402 where additional data may be received.

If a parameter value exceeds a predetermined value, method 400 may proceed to stage 406 where a corrective action may be identified. For example, if the temperature of fries drops below a preset value, then a corrective action may be to discard the fries. If a vibration, temperature and/or pressure of a food service device is outside an acceptable range, then a maintenance item may be identified. A corrective action may include generating a training plan for at least one of the workers based on a number of alarms associated with the at least one of the workers. For example, a plurality of alarms are generated by a fryer, then the worker data may be used to identify a worker that may be responsible for the alarms and corrective actions, such a additional training, may be needed.

From stage 406 method 400 may proceed to stage 408 where an alarm may be activated. For example, when a parameter exceeds a predetermined value then an alarm may be activated so as to alert workers or oilier employees that may initiate corrective action. Activating an alarm may include transmitting a message to a remote computer. The message may include a text message or email that identifies the parameter that is outside of specification and include the corrective action needed to address the problem. Activating an alarm may also include transmitting an activation signal to an audible or visual alarm located proximate the first food service device. For example, food service device and/or server 106 may transmit an activation signal to a speaker and/or sign located proximate the food service device that triggered the alarm. The alarm may also include transmitting a message identifying the maintenance item to a remote computer. The remote computer may be located at a maintenance facility and may notify maintenance staff of service that needs to be performed.

From stage 408 method 400 may proceed to stage 410 where corrective action may be taken. For example, food may be discarded in response to the alarm being activated. Other corrective action may include performing maintenance as indicated in the transmitted message. Implementing a training regimen may be included in taking corrective action.

One skilled in the art will understand from this disclosure that the various stages of method 400 may be reordered, repeated, and/or omitted. For example, stage 406 where a corrective action is identified may be omitted. Stages 402, 404, 406, and 408 may be repeated multiple times before stage 410 is executed. For example, stage 310 may be repeated after a given number of alarms have been activated.

One skilled in the art will understand from this disclosure that the various other implementations are possible. For example, if temperature data from a device is outside range repeatedly that could be indicative of a maintenance item that can be alerted In another example, if sales data has a mismatch with the fries drop data in terms of quantities sold and quantities produced, that could be an indication of a problem, such a theft.

One skilled in the art will understand from this disclosure that method 400 can be performed by local servers and remote servers. For instance, food service devices 104 and/or sensors 108 may be part of the Internet of Things (IoT) equipped unique identifiers so as to distinguish one device/sensor from another on network 112. The unique identifier may identify both the item as well as a store where the item is located. As such, server 106, which may be located offsite, can communicate with food service devices 104 and/or sensors 108 via network 112. As such, server 106 can determine if one of food service devices 104 experiences a malfunction, and shut down a malfunctioning device.

Server 106 may also be local (i.e., located at store 102) and communicate with additional servers. As such, server 106 may generate message (i.e., alarms) that are sent to remote servers and the remote servers may transmit signals to food service devices 104 and/or sensors 108 to shut them down or otherwise control them. The remote servers may also transmit the messages to server 106, which may in turn transmit signals to food service devices 104 and/or sensors 108 to shut them down or otherwise control them.

Examples

Example 1 is a method comprising: receiving, at a computing device, first temperature data from a first food service device, the first temperature data corresponding to a food temperature of food; determining, by the computing device, when the first temperature data exceeds a predetermined temperature value, and activating, by the computing device, a first alarm when the first temperature data exceeds the predetermined temperature value.

In Example 2, the subject matter of Example 1 optionally includes receiving a first drop time; receiving a second drop time; and activating a second alarm when the second drop time is not received within a predetermined time.

In Example 3, the subject matter of any one or more of Examples 1-2 optionally include receiving second temperature data from a second food service device, the second temperature data corresponding to the food temperature; activating the first alarm when the second temperature data exceeds the predetermined temperature value.

In Example 4, the subject matter of any one or more of Examples 1-3 optionally include receiving worker data that identifies workers and the worker's duties and schedule, and generating a training plan for at least one of the workers based on a number of alarms associated with the at least one of the workers.

Example 5, the subject matter of any one or more of Examples 1-4 optionally include receiving equipment data that identifies operating conditions of a piece of equipment, identifying a maintenance item, and transmitting a message identifying the maintenance item to a remote computer.

In Example 6, the subject matter of any one or more of Examples 1-5 optionally include wherein activating the alarm includes transmitting a message to a remote computer.

In Example 7, the subject matter of any one or more of Examples 1-6 optionally include wherein activating the alarm includes transmitting an activation signal to an audible or visual alarm located proximate the first food service device.

In Example 8, the subject matter of any one or more of Examples 1-7 optionally include discarding the food in response to the first alarm being activated.

Example 9 is a method comprising, receiving, at a computing device, first temperature data from a first food service device, the first temperature data corresponding to a food temperature of food, transferring the food to a second food service device, receiving, at the computing device, second temperature data from a second food service device, the second temperature data corresponding to the food temperature; determining, by the computing device, when the first temperature data or the second temperature data exceeds a predetermined temperature value, activating, by the computing device, a first alarm when the first temperature data or the second temperature data exceeds the predetermined temperature value, and discarding the food in response to the first alarm being activated.

In Example 10, the subject matter of Example 9 optionally includes receiving equipment data that identifies operating conditions of the first food service device and the second food service device; identifying a maintenance item for the first food service device or the second food service device, transmitting a message identifying the maintenance item to a remote computer; and performing the maintenance item.

In Example 11, the subject matter of any one or more of Examples 9-10 optionally include receiving worker data that identifies a worker operating the first food service device or the second food service device; generating a training plan for the worker based on a number of alarms associated with the worker, and implementing the training plan.

In Example 12, the subject matter of any one or more of Examples 9-11 optionally include wherein activating the alarm includes transmitting a message to a remote computer.

In Example 13, the subject matter of any one or more of Examples 9-12 optionally include wherein activating the alarm includes transmitting an activation signal to an audible or visual alarm located proximate the first food service device.

Example 14 is a system comprising: a first food service device comprising a first sensor; a processor in electrical communication with the sensor; and a memory storing instructions that, when executed by the processor, cause the processor to perform actions comprising, receiving first temperature data from the first sensor, the first temperature data corresponding to a food temperature of food, determining when the first temperature data exceeds a predetermined temperature value, and activating a first alarm when the first temperature data exceeds the predetermined temperature value.

In Example 15, the subject matter of Example 14 optionally includes wherein the actions further comprise: receiving a first drop time from the first food service device; receiving a second drop time from the first food service device; and activating a second alarm when the second drop time is not received within a predetermined time.

In Example 16, the subject matter of any one or more of Examples 14-15 optionally include a second food service device comprising a second sensor, wherein the actions further comprise: receiving second temperature data from the second sensor, the second temperature data corresponding to the food temperature; determining when the second temperature data exceeds the predetermined temperature value; and activating a second alarm when the second temperature data exceeds the predetermined temperature value.

In Example 17, the subject matter of any one or more of Examples 14-16 optionally include a second sensor coupled to the first food service device, wherein the actions further comprise: receiving second temperature data from the second sensor, the second temperature data corresponding to the food temperature; activating the first alarm when the second temperature data exceeds the predetermined temperature value.

In Example 18, the subject matter of any one or more of Examples 14-17 optionally include a vibration sensor coupled to the first food service device, wherein the actions further comprise: receiving vibration data that identifies vibration within the first food service device; identifying a maintenance item; and transmitting a message identifying the maintenance item to a remote computer.

In Example 19, the subject matter of any one or more of Examples 118 optionally include wherein activating the alarm includes transmitting a message to a remote computer.

In Example 20, the subject matter of any one or more of Examples 119 optionally include wherein activating the alarm includes transmitting an activation signal to an audible or visual alarm located proximate the first food service device.

In Example 21, the media rotation mechanisms, media terminals, and methods of any one of or any combination of Examples 1-20 are optionally configured such that all elements or options recited are available to use or select from.

The above detailed description refers to the accompanying drawings. Wherever possible, the same reference numbers are used in the drawings and the description to refer to the same or similar elements. While embodiments and examples are described, modifications, adaptations, and other implementations are possible. For example, substitutions, additions, and/or modifications may be made to the elements and stages illustrated in the drawings, and the systems and methods described herein may be modified by substituting, reordering, and/or adding stages to the disclosed methods and/or elements to the discloses systems. Accordingly, the detailed description does not limit this disclosure. Instead, the proper scope of any invention disclosed herein is defined by the appended claims.

It will be readily understood to those skilled in the art that various other changes in the details, material, and arrangements of the parts and method stages which have been described and illustrated in order to explain the nature of the subject matter may be made without departing from the principles and scope of the inventive subject matter as expressed in the subjoined claims.

What is claimed is:

1. A method comprising:
receiving, at a computing device, first temperature data from a first food service device, the first temperature data corresponding to a food temperature of food;
determining, by the computing device, when the first temperature data exceeds a predetermined temperature value;
activating, by the computing device, a first alarm when the first temperature data exceeds the predetermined temperature value;
receiving a first drop time;
receiving a second drop time;
activating a second alarm when the second drop time is not received within a predetermined time;
receiving worker data that identifies workers and the worker's duties and schedule; and
generating a training plan for at least one of the workers based on a number of alarms associated with the at least one of the workers.

2. The method of claim 1, further comprising:
receiving second temperature data from a second food service device, the second temperature data corresponding to the food temperature;
activating the first alarm when the second temperature data exceeds the predetermined temperature value.

3. The method of claim 1, further comprising:
receiving equipment data that identifies operating conditions of a piece of equipment;
identifying a maintenance item; and
transmitting a message identifying the maintenance item to a remote computer.

4. The method of claim 1, wherein activating the alarm includes transmitting a message to a remote computer.

5. The method of claim 1, wherein activating the alarm includes transmitting an activation signal to an audible or visual alarm located proximate the first food service device.

6. The method of claim 1, further comprising discarding the food in response to the first alarm being activated.

7. A method comprising:
receiving, at a computing device, first temperature data from a first food service device, the first temperature data corresponding to a food temperature of food;
transferring the food to a second food service device;
receiving, at the computing device, second temperature data from a second food service device, the second temperature data corresponding to the food temperature;
determining, by the computing device, when the first temperature data or the second temperature data exceeds a predetermined temperature value;
activating, by the computing device, a first alarm when the first temperature data or the second temperature data exceeds the predetermined temperature value;
discarding the food in response to the first alarm being activated;
receiving a first drop time;
receiving a second drop time;
activating a second alarm when the second drop time is not received within a predetermined time;
receiving worker data that identifies a worker operating the first food service device or the second food service device;
generating a training plan for the worker based on a number of alarms associated with the worker; and
implementing the training plan.

8. The method of claim 7, further comprising:
receiving equipment data that identifies operating conditions of the first food service device and the second food service device;
identifying a maintenance item for the first food service device or the second food service device;
transmitting a message identifying the maintenance item to a remote computer; and
performing the maintenance item.

9. The method of claim 7, wherein activating the alarm includes transmitting a message to a remote computer.

10. The method of claim 7, wherein activating the alarm includes transmitting an activation signal to an audible or visual alarm located proximate the first food service device.

11. A system comprising:
a first food service device comprising a first sensor;
a processor in electrical communication with the sensor; and
a memory storing instructions that, when executed by the processor, cause the processor to perform actions comprising:
  receiving first temperature data from the first sensor, the first temperature data corresponding to a food temperature of food,
  determining when the first temperature data exceeds a predetermined temperature value, and
  activating a first alarm when the first temperature data exceeds the predetermined temperature value,
  receiving a first drop time from the first food service device,
  receiving a second drop time from the first food service device, and
  activating a second alarm when the second drop time is not received within a predetermined time,
  receiving worker data that identifies a worker operating the first food service device or the second food service device, and
  generating a training plan for the worker based on a number of alarms associated with the worker.

12. The system of claim 11, further comprising a second food service device comprising a second sensor, wherein the actions further comprise:
  receiving second temperature data from the second sensor, the second temperature data corresponding to the food temperature;
  determining when the second temperature data exceeds the predetermined temperature value; and
  activating a second alarm when the second temperature data exceeds the predetermined temperature value.

13. The system of claim 11, further comprising a second sensor coupled to the first food service device, wherein the actions further comprise:
  receiving second temperature data from the second sensor, the second temperature data corresponding to the food temperature;
  activating the first alarm when the second temperature data exceeds the predetermined temperature value.

14. The system of claim 11, further comprising a vibration sensor coupled to the first food service device, wherein the actions further comprise:
  receiving vibration data that identifies vibration within the first food service device;
  identifying a maintenance item; and
  transmitting a message identifying the maintenance item to a remote computer.

15. The method of claim 1, wherein activating the alarm includes transmitting a message to a remote computer.

16. The method of claim 1, wherein activating the alarm includes transmitting an activation signal to an audible or visual alarm located proximate the first food service device.

* * * * *